E. S. PORTER.
MACHINE FOR ASSORTING FRUIT ACCORDING TO SIZE.
APPLICATION FILED OCT. 7, 1919.
1,342,571.
Patented June 8, 1920.
2 SHEETS—SHEET 1.
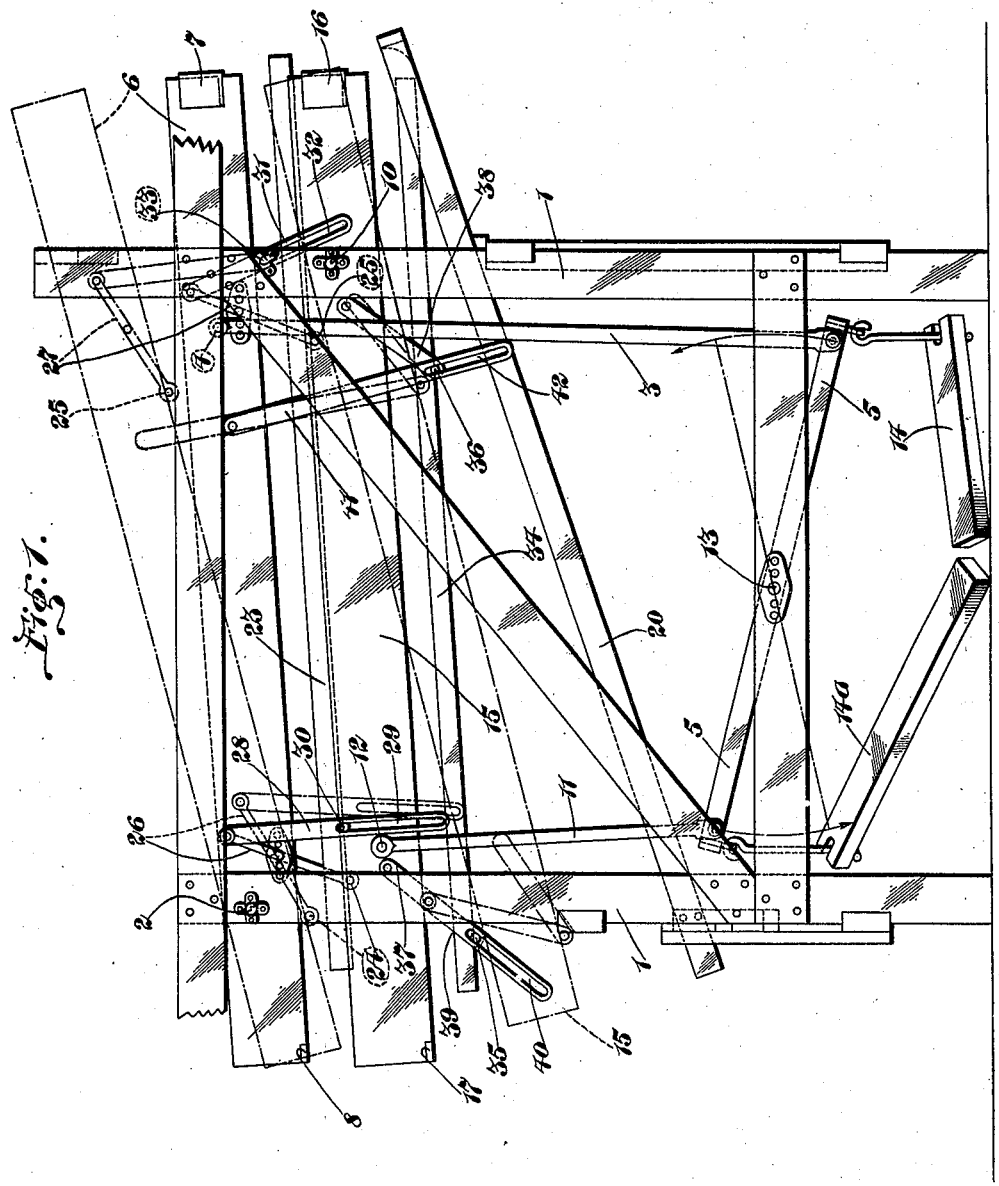

E. S. PORTER.
MACHINE FOR ASSORTING FRUIT ACCORDING TO SIZE.
APPLICATION FILED OCT. 7, 1919.
1,342,571.
Patented June 8, 1920.
2 SHEETS—SHEET 2.
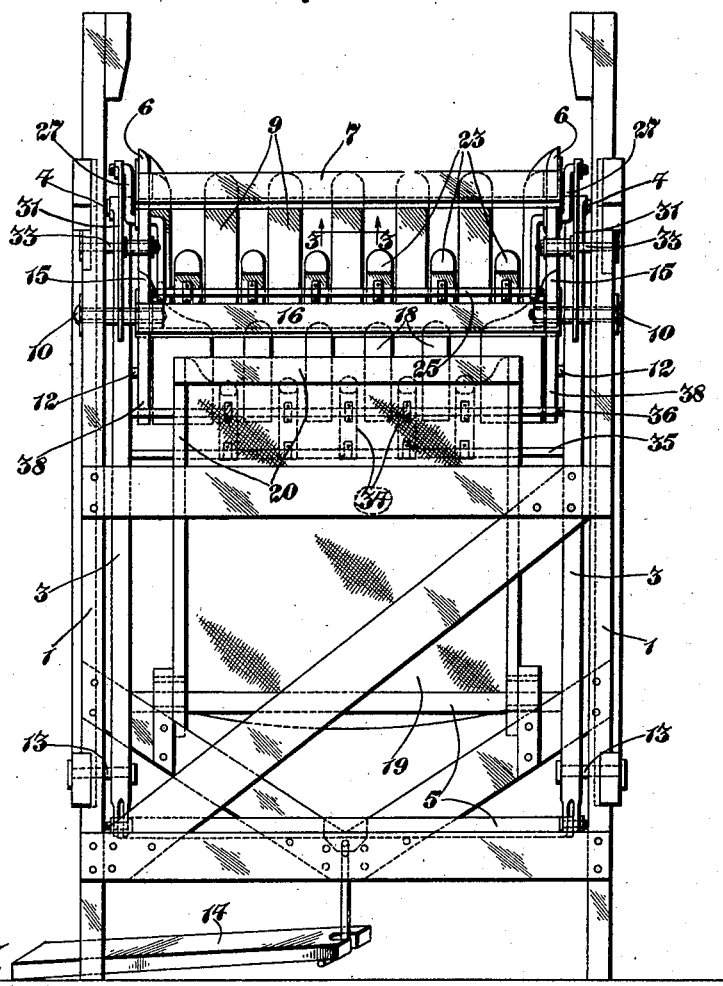
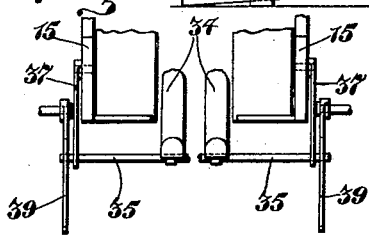
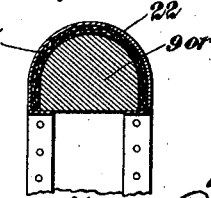

UNITED STATES PATENT OFFICE.

EDGAR S. PORTER, OF CLIFTON, COLORADO.

MACHINE FOR ASSORTING FRUIT ACCORDING TO SIZE.

1,342,571. Specification of Letters Patent. Patented June 8, 1920.

Application filed October 7, 1919. Serial No. 328,983.

*To all whom it may concern:*

Be it known that I, EDGAR S. PORTER, a citizen of the United States, residing in the city of Clifton, Mesa county, State of Colorado, have invented a new and useful Machine for Assorting Fruit According to Size, of which the following is a specification.

This invention relates to machines for assorting fruit according to size.

An object of the invention is to provide a machine for separating fruit in the sizes desired for commercial packing.

In the specific form of the invention shown in the drawings, the machine is equipped for assorting and separating fruit such, for instance, as pears into three sizes; and it will be understood that the machine may be used for assorting or separating fruit according to any size called for or required by the market or the conditions of trade, etc., where the fruit is to be sold or used. Accordingly, I do not restrict myself to a machine for assorting or separating the fruit according to any invariable size, or according to any invariable number of sizes, since construction and operation of the machine may readily be varied within the limits of the invention as required to serve the purposes desired.

In the drawings, in which one embodiment of the invention is shown,

Figure 1 is a side elevation of a machine constructed and arranged to operate to separate the fruit according to three sizes.

Fig. 2 is an end elevation of the machine.

Fig. 3 is an enlarged sectional view on the line 3—3 of Fig. 2, showing a preferred construction of one of the padded slats of the assorting devices.

Fig. 4 is a detailed view showing the separating and actuating connections for separating and actuating the stirrer of the lower tray.

The mechanism by which the fruit is assorted and separated according to size is operated by a supporting frame 1 and comprises one or more trays arranged to operate to sift therethrough the smaller sizes of fruit which may pass between the slats, while the larger sizes of the fruit cannot pass between the slats of the trays and are thereby separated from the smaller sizes which do pass between the slats. As shown, there is an upper tray supported at one end of the frame by a pivot or pivots 2 and at its opposite end by links 3, the upper ends of which are connected to the tray by pivots 4 and the lower ends of which are pivoted to a rocking frame 5. From this it is obvious that by raising and lowering the links 3, the end of the tray supported by said links will be raised and lowered.

The upper tray, which is now being considered, comprises side walls 6, a cross member 7 connected to one end of the side walls and a cross member 8 connected to the opposite ends of the side walls. A number of spaced strips 9 are supported by the cross members 7 and 8. Said strips are spaced to permit all of the fruit except the largest size to pass between said strips and onto the next lower tray which is similarly constructed.

The next lower tray is supported on a pivot or pivots 10 at the end opposite from the end at which the upper tray is pivoted. The opposite end of the lower tray is supported by links 11 whose upper ends are connected to the side walls of the lower tray by pivots 12, and whose lower ends are pivoted to the opposite end of the rocking frame 5 as will be understood by reference to Fig. 1. The rocking frame 5 is supported intermediate of its ends upon a pivot or pivots 13. As a result of this construction, one end of the upper tray will be alternately raised and lowered and the opposite end of the lower tray will be alternately lowered and raised as required to move the fruit along the trays, respectively. This movement of the trays is effected by oscillating or rocking the frame 5 for which purpose I have provided a treadle 14 in connection with one end of said rocking frame and a treadle 14ª in connection with the opposite end of said rocking frame.

The lower tray is of the same construction as the upper tray and comprises side walls 15, a cross member 16 connected to one end of the side walls, a cross member 17 connected to the opposite ends of the side walls and spaced strips 18 supported by the cross members 16 and 17 and arranged to permit the smaller sizes of the fruit to pass between them and into any suitable device or receptacle arranged to receive the fruit. For such purpose, I have shown an inclined chute 19 composed of canvas or any other appropriate material supported within a frame 20. The chute is arranged so as to receive all the fruit passing between the slats of the lower tray and is inclined so as to discharge the fruit at one end.

The walls and slats of the trays are preferably padded with soft material 21 (Fig. 3) and covered with a smooth-surface material 22, such as oil-cloth, or the like, in order to promote the movement of the fruit along the trays and to prevent damage to the fruit and to the padding.

A lifter or stirrer is preferably provided for each tray. The lifters or stirrers are constructed and arranged to operate between the slats of the trays, respectively, in order to loosen and prevent clogging of the fruit between the slats of the trays, and to cause the proper sizes of the fruit to pass between the slats of the trays and to cause the larger sizes of the fruit to move along the trays to the discharge ends thereof. In the embodiment shown, the lifters or stirrers are supported by the trays. The lifter or stirrer for the upper tray comprises a number of spaced strips or slats 23 supported at one end upon a transverse rod 24 and at the opposite end upon a transverse rod 25. The strips or slats 23 are arranged so that during operation of the machine they will be moved into the spaces between the strips or slats 9 of the upper tray so as to loosen and prevent clogging of the fruit in the tray. The rod 24 is supported at the lower ends of a pair of crank levers 26 and the rod 25 is supported at the lower ends of a pair of crank levers 27; said levers 26 and 27 being supported by the upper tray. The upper ends of the levers 26 are connected to the lower tray by links 28, the lower ends of which have slots 29 receiving pins 30 on the side walls of the lower tray. The upper ends of the crank levers 27 are connected to links 31 having slots 32 in the lower portions thereof, receiving projections 33 from the frame 1. As a result of this construction, oscillation of the rocking frame 5 alternately raises one end of the upper tray from the position in which it is shown in Fig. 1 to the position indicated by dotted lines; and at the same time that the upper tray is so operated, the lower tray is alternately moved from the position shown in Fig. 1 to the position indicated by dotted lines. This operation of the upper and lower trays rocks the levers 26 and 27 and moves the strips or slats 23 into the spaces between the strips or slats 9 of the upper tray, thus loosening the fruit and causing the small or medium size fruit to pass between the bottom slats of the upper tray and causing large size fruit to move along the upper tray toward the lower end thereof from which the large size fruit is removed or discharged.

The lower tray is provided with a similar stirrer or agitator comprising strips or slats 34 which are supported at one end upon a rod 35 and at the opposite end by a rod 36. The rod 35 is supported by the lower ends of the links 37, the upper ends of which are pivoted to the side walls of the lower tray; and the rod 36 is carried by the lower ends of the links 38, the upper ends of which are pivoted to the side walls of the lower tray. The links 39 are pivoted to the frame of the machine and have elongated slots 40 receiving the ends of the rod 35 so that when the end of the lower tray moves to its lower position indicated by dotted lines in Fig. 1, the stirrer or agitator slats 34, will be moved into the spaces between the strips or slats 18 of the lower tray. Links 41 have their upper ends pivoted to the upper tray and at their lower ends are provided with slots 42 receiving the ends of the rod 36; as a result of which construction and arrangement, the stirrer or agitator 34 loosens the fruit in the lower tray, causing the undersize fruit to drop through the lower tray onto the chute 19 and causing the medium size fruit on the lower tray to move along the tray toward the lower or discharge end of the tray.

From the foregoing, it will be clearly apparent that my invention is complete and satisfactorily serves its purpose. It will be understood that construction of the machine may be varied in various particulars without departure from the principle and nature of the invention. Accordingly, I do not restrict myself unessentially, but what I claim and desire to secure by Letters Patent is:

1. A device of the character described, comprising a tray through which the separated material may pass supported by stationary pivots near one end, a stirrer supported by the tray below the lower side thereof, mechanism for raising and lowering the end of the tray opposite from the end at which it is pivoted, and means for simultaneously operating said stirrer to cause movement of the contents of the tray.

2. A machine of the character described, comprising a tray through which the separated material may pass pivoted at one end, a lower tray pivoted at the opposite end, a device for raising and lowering the ends of the trays opposite from their pivots, and stirrers supported by said trays for causing movement of the contents of the trays.

3. A machine of the character described, comprising an upper tray having openings through the bottom thereof, a lower tray arranged to receive fruit discharged through the openings through the bottom of the upper tray, and mechanism for oscillating said trays concurrently.

4. A machine of the character described, comprising an upper tray having openings through the bottom thereof, a lower tray arranged to receive fruit discharged through the openings through the bottom of the upper tray, mechanism for oscillating said trays concurrently, and a stirrer coöperating with each tray to cause movement of the fruit in the trays as said trays are oscillated.

5. A device of the character described, comprising a pivotally supported tray having openings through the bottom thereof, a stirrer device supported by the tray below the lower side thereof, and mechanism for oscillating the tray and the stirrer device to cause the stirrer device to extend into said openings as required to cause movement of the contents of the tray.

6. A machine for assorting fruit according to size, comprising a tray arranged to receive the fruit and having openings through the bottom thereof, a stirrer supported below the tray arranged to be moved into and out of said openings to cause movement of the fruit in the tray and to cause the smaller sized fruit to pass through said openings, mechanism for operating the stirrer to cause movement of the fruit in the tray and to cause the smaller sized fruit to pass through said openings, and a device for receiving the fruit that has passed through said openings.

7. A machine for assorting fruit according to size, comprising an upper tray arranged to receive all of the fruit to be assorted and having openings through the bottom thereof, a stirrer arranged to enter said openings to prevent clogging of the fruit in said openings and to cause the smaller sized fruit to pass through said openings, a lower tray supported below the upper tray arranged to receive all of the fruit that passes through the openings through the bottom of the upper tray, and having openings through the bottom thereof through which the undersized fruit may pass, a stirrer movable into and out of the openings through the bottom of the lower tray to cause the undersized fruit to pass through said openings, and mechanism for oscillating said trays to cause the fruit which cannot pass through the openings through the bottoms of said trays to move toward one end of said trays.

8. A machine for assorting fruit according to size, comprising an upper tray arranged to receive all of the fruit to be assorted and having openings through the bottom thereof, a stirrer arranged to enter said openings to prevent clogging of the fruit in said openings, and to cause the smaller sized fruit to pass through said openings, a lower tray supported below the upper tray arranged to receive all of the fruit that passes through the openings through the bottom of the upper tray, and having openings through the bottom thereof through which the undersized fruit may pass, a stirrer movable into and out of the openings through the bottom of the lower tray to cause the undersized fruit to pass through said openings, mechanism for oscillating said trays to cause the fruit which cannot pass through the openings through the bottoms of said trays to move toward one end of said trays, and mechanism for operating said stirrers into and out of the openings through the bottoms of said trays.

9. A machine for assorting fruit according to size, comprising a pair of pivotally supported trays, supported one above the other and each having openings through the bottom thereof for the passage of fruit less than a desired size, mechanism for oscillating said trays concurrently to cause fruit less than a desired size to pass through the openings through the bottom of the upper tray into the lower tray and to cause fruit less than another desired size to pass through the openings through the bottom of the lower tray, and a stirrer device coöperating with each tray to prevent lodgment of the fruit in said openings.

10. A machine for assorting fruit according to size, comprising a pair of pivotally supported trays, supported one above the other and each having openings through the bottom thereof for the passage of fruit less than a desired size, mechanism for oscillating said trays concurrently to cause fruit less that a desired size to pass through the openings through the bottom of the upper tray into the lower tray and to cause fruit less than another desired size to pass through the openings through the bottom of the lower tray, and a stirrer device coöperating with each tray to prevent lodgment of the fruit in said openings, and mechanism for operating said trays and said stirrer devices concurrently.

11. A machine for assorting fruit according to size, comprising a number of pivotally supported trays arranged one above the other and having openings through the bottoms thereof to permit passage of fruit less than predetermined sizes, the fruit from the upper tray being received by a lower tray, mechanism for oscillating said trays to cause movement of the fruit, a stirrer device arranged to coöperate with each tray, and mechanism for operating said stirrer device to cause movement of the fruit along the trays and to prevent lodgment of the fruit in the openings in the bottoms of the trays.

12. A machine for assorting fruit according to size, comprising a frame, a tray pivoted in said frame and having openings through the bottom thereof, means for raising and lowering one end of said tray to keep the fruit within the tray in motion, crank levers supported by the tray, elements supported by the crank levers arranged to be moved into and out of the openings through the bottom of the tray to stir the fruit, and mechanism for actuating said crank levers to move said elements into and out of the openings through the bottom of the tray as aforesaid.

13. A machine for assorting fruit according to size, comprising a frame, a tray pivotally supported in the frame for receiving the fruit to be assorted and having openings through the bottom thereof, mechanism for raising and lowering one end of said tray to cause the largest size fruit to move along the tray and to cause the smaller sizes of fruit to pass through said openings through the bottom of the tray, crank levers supported by the tray, elements supported by said crank levers for movement into and out of the openings through the bottom of the tray to insure movement of the fruit as aforesaid, an additional tray pivotally supported in the frame below the first-named tray to receive the fruit that passes through said openings in the first-named tray and having openings through the bottoms thereof through which the undersized fruit may pass while the remaining fruit is prevented from passing through said openings, a stirrer device movable into and out of the openings through the bottom of the second-named tray to insure movement of the fruit as aforesaid, means for raising and lowering one end of the second-named tray concurrently with the movement of the first-named tray, and means for moving said elements and said stirrer device into and out of the openings through the bottoms of said trays, respectively, as an incident to the raising and lowering of the ends of said trays.

14. A machine for assorting fruit according to size, comprising a frame, a tray pivotally supported in the frame for receiving the fruit to be assorted and having openings through the bottom thereof, mechanism for raising and lowering one end of said tray to cause the largest size fruit to move along the tray and to cause the smaller sizes of fruit to pass through said openings through the bottom of the tray, crank levers supported by the tray, elements supported by said crank levers for movement into and out of the openings through the bottom of the tray to insure movement of the fruit as aforesaid, an additional tray pivotally supported in the frame below the first-named tray to receive the fruit that passes through said openings in the first-named tray and having openings through the bottoms thereof through which the undersized fruit may pass while the remaining fruit is prevented from passing through said openings, a stirrer device movable into and out of the openings through the bottom of the second-named tray to insure movement of the fruit as aforesaid, means for raising and lowering one end of the second-named tray concurrently with the movement of the first-named tray, means for moving said elements and said stirrer device into and out of the openings through the bottoms of said trays, respectively, as an incident to the raising and lowering of the ends of said trays, and a chute for receiving the fruit passing through the openings through the bottom of the second-named tray.

15. A machine for assorting fruit according to size, comprising a pair of trays supported one above the other, the upper tray having openings through the bottom thereof to permit smaller sizes of fruit to pass therethrough into the lower tray, mechanism for oscillating said trays to cause the larger size fruit to move along the upper tray to one end thereof and to cause the smaller sizes of fruit to pass through said openings into the lower tray, a stirrer device movable into and out of the openings through the bottom of the upper tray to assist the movement of the larger size fruit along the upper tray and to insure passage of the smaller size fruit through the openings through the bottom of the upper tray, and mechanism for operating said stirrer.

16. A machine for assorting fruit according to size, comprising an upper tray arranged to receive all of the fruit to be assorted and to discharge at one end thereof all fruit of a predetermined size and having openings through the bottom thereof to permit the passage therethrough of all fruit less than the predetermined size mentioned; a second tray below the first-named tray arranged to receive all fruit discharged passing through said openings through the bottom of the first-named tray and arranged to discharge at one end thereof all fruit of a predetermined size, less than the size discharged from the end of the first-named tray, and having openings through the bottom thereof to permit the passage therethrough of all fruit less than said second-named predetermined size; and mechanism for oscillating said trays to cause movement of the fruit as aforesaid.

17. A machine for assorting fruit according to size, comprising an upper tray arranged to receive all of the fruit to be assorted and to discharge at one end thereof all fruit of a predetermined size and having openings through the bottom thereof to permit the passage therethrough of all fruit less than the predetermined size mentioned; a second tray below the first-named tray arranged to receive all fruit discharged passing through said openings through the bottom of the first-named tray and arranged to discharge at one end thereof all fruit of a predetermined size less than the size discharged from the end of the first-named tray, and having openings through the bottom thereof to permit the passage therethrough of all fruit less than said second-named predetermined size, mechanism for oscillating said trays to cause movement of the fruit as aforesaid, and stirrer devices arranged to operate into and out of the openings through the bottoms of said trays, respectively, to cause movement of the fruit of said predetermined sizes from the discharge ends of said trays and to insure the passage of the fruit less than said predetermined sizes through said openings.

18. A machine for assorting fruit according to size, comprising an upper tray arranged to receive all of the fruit to be assorted and to discharge at one end thereof all fruit of a predetermined size and having openings through the bottom thereof to permit the passage therethrough of all fruit less than the predetermined size mentioned; a second tray below the first-named tray arranged to receive all fruit discharged passing through said openings through the bottom of the first-named tray and arranged to discharge at one end thereof all fruit of a predetermined size less than the size discharged from the end of the first-named tray, and having openings through the bottom thereof to permit the passage therethrough of all fruit less than said second-named predetermined size, mechanism for oscillating said trays to cause movement of the fruit as aforesaid, stirrer devices arranged to operate into and out of the openings through the bottoms of said trays, respectively, to cause movement of the fruit of said predetermined sizes from the discharge ends of said trays and to insure the passage of the fruit less than said predetermined sizes through said openings, and a chute arranged to receive the fruit discharged through the openings through the bottom of said second-named tray.

19. A machine for assorting fruit according to size, comprising a tray arranged to receive all of the fruit to be assorted and to discharge at one end thereof all of the fruit of a predetermined size and having openings through the bottom thereof for the passage therethrough of all fruit less than the said predetermined size; a second tray arranged to receive all of the fruit discharged from the first-named tray through said openings and to discharge, at one end thereof, all fruit of another predetermined size and having openings through the bottom thereof for the passage of all fruit less than said second predetermined size; mechanism for oscillating said trays to cause movement of said predetermined sizes of fruit toward the discharge ends of said trays; and means for operating said mechanism.

20. A machine for assorting fruit according to size, comprising a tray arranged to receive all of the fruit to be assorted and to discharge at one end thereof all of the fruit of a predetermined size and having openings through the bottom thereof for the passage therethrough of all fruit less than the said predetermined size; a second tray arranged to receive all of the fruit discharged from the first-named tray through said openings and to discharge, at one end thereof, all fruit of another predetermined size and having openings through the bottom thereof for the passage of all fruit less than said second predetermined size; mechanism for oscillating said trays to cause movement of said predetermined sizes of fruit toward the discharge ends of said trays, means for operating said mechanism, and devices operated as an incident to the oscillation of said trays to cause movement of the said predetermined sizes of fruit toward the discharge ends of said trays and to cause the fruit of less than said predetermined sizes to pass through said openings as aforesaid.

21. A machine for assorting fruit according to size, comprising a tray arranged to receive all of the fruit to be assorted and to discharge at one end thereof all of the fruit of a predetermined size and having openings through the bottom thereof for the passage therethrough of all fruit less than the said predetermined size; a second tray arranged to receive all of the fruit discharged from the first-named tray through said openings and to discharge, at one end thereof, all fruit of another predetermined size and having openings through the bottom thereof for the passage of all fruit less than said second predetermined size; mechanism for oscillating said trays to cause movement of said predetermined sizes of fruit toward the discharge ends of said trays, means for operating said mechanism, devices operated as an incident to the oscillation of said trays to cause movement of the said predetermined sizes of fruit toward the discharge ends of said trays and to cause the fruit of less than said predetermined sizes to pass through said openings as aforesaid, and a device for receiving and discharging the fruit passing through the openings through the bottom of said second-named tray.

EDGAR S. PORTER.